(12) United States Patent
Yao et al.

(10) Patent No.: US 12,301,060 B2
(45) Date of Patent: May 13, 2025

(54) ROTORS FOR ELECTRIC MOTORS

(71) Applicant: GM Global Technology Operations LLC, Detroit, MI (US)

(72) Inventors: Jian Yao, Shanghai (CN); Vincent Fedida, Shanghai (CN); Alan G. Holmes, Clarkston, MI (US); Chengwu Duan, Shanghai (CN); Yusheng Zou, Northville, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 320 days.

(21) Appl. No.: 18/074,085

(22) Filed: Dec. 2, 2022

(65) Prior Publication Data

US 2024/0146130 A1 May 2, 2024

(30) Foreign Application Priority Data

Oct. 27, 2022 (CN) .......................... 202211326657.8

(51) Int. Cl.
| | | |
|---|---|---|
| *H02K 1/2798* | (2022.01) | |
| *H02K 1/18* | (2006.01) | |
| *H02K 1/2793* | (2022.01) | |
| *H02K 16/02* | (2006.01) | |
| *H02K 21/24* | (2006.01) | |

(52) U.S. Cl.
CPC ........... *H02K 1/2798* (2022.01); *H02K 1/182* (2013.01); *H02K 1/2793* (2013.01); *H02K 16/02* (2013.01); *H02K 21/24* (2013.01)

(58) Field of Classification Search
CPC ...... H02K 16/02; H02K 21/24; H02K 1/2798; H02K 1/182; H02K 1/2793; H02K 1/2796; H02K 21/026; H02K 37/08

USPC ............... 310/156.32, 156.36, 156.37, 49.42
See application file for complete search history.

(56) References Cited

U.S. PATENT DOCUMENTS

| | | | |
|---|---|---|---|
| 2004/0135453 A1* | 7/2004 | Naito | .................... H02K 1/2795 310/67 R |
| 2018/0198335 A1* | 7/2018 | Inoue | ...................... H02K 16/02 |
| 2024/0039350 A1* | 2/2024 | Geng | ...................... H02K 21/24 |

FOREIGN PATENT DOCUMENTS

| | | |
|---|---|---|
| CN | 214479912 U | 10/2021 |
| JP | 2007043864 A | 2/2007 |
| JP | 2008278649 A | 11/2008 |
| JP | 2012249347 A | * 12/2012 |
| JP | 2016063666 A | 4/2016 |

OTHER PUBLICATIONS

Takeda Takeshi, Rotor of Axial Gap Rotary Electric Machine, Dec. 13, 2012, JP 2012249347 (English Machine Translation) (Year: 2012).*

Germany Office Action Issued Oct. 18, 2023 in P103212-SEC-NP-DE01.

* cited by examiner

*Primary Examiner* — Alexander A Singh
(74) *Attorney, Agent, or Firm* — CANTOR COLBURN LLP (57) ABSTRACT

An example rotor includes a rotor yoke having an outer circumference and an inner circumference. The rotor further includes a plurality of rotor ribs on a surface the rotor yoke and extending between the outer circumference and the inner circumference. The rotor further includes a plurality of magnets, each of the plurality of magnets being disposed adjacent to and between two of the plurality of rotor ribs.

20 Claims, 6 Drawing Sheets

ROTORS FOR ELECTRIC MOTORS

CROSS-REFERENCE TO RELATED APPLICATIONS

This application claims the benefit of Chinese Patent Application No. 202211326657.8 filed Oct. 27, 2022, the disclosure of which is incorporated herein by reference in its entirety.

INTRODUCTION

Embodiments described herein generally relate to electric motors, and more specifically, to rotors for electric motors.

Modern vehicles (e.g., a car, a motorcycle, a boat, or any other type of automobile) may be equipped with one or more electric motors, such as to drive a wheel(s) of the vehicle. For example, an electric motor can be mechanically coupled to a wheel of a vehicle to apply rotational force to the wheel, creating a driveline. In some examples, a vehicle can include multiple electric motors. The electric motor(s) receives electric power from a rechargeable energy storage system (RESS), which can include one or more batteries for storing electric power. The batteries can be recharged, for example, using a charging station. The RESS can also provide electric power to other systems of the vehicle (e.g., climate control systems, infotainment systems, etc.).

SUMMARY

In one exemplary embodiment, a rotor is provided. The rotor includes a rotor yoke having an outer circumference and an inner circumference. The rotor further includes a plurality of rotor ribs on a surface the rotor yoke and extending between the outer circumference and the inner circumference. The rotor further includes a plurality of magnets, each of the plurality of magnets being disposed adjacent to and between two of the plurality of rotor ribs.

In addition to one or more of the features described herein, or as an alternative, further embodiments of the rotor may include that the plurality of rotor ribs have a substantially rectangular cross section.

In addition to one or more of the features described herein, or as an alternative, further embodiments of the rotor may include that the plurality of rotor ribs have a substantially trapezoidal cross section.

In addition to one or more of the features described herein, or as an alternative, further embodiments of the rotor may include that at least one of the plurality of magnets is adjacent to but spaced apart from at least one of the plurality of rotor ribs, defining a gap between the at least one of the plurality of magnets and the at least one of the plurality of rotor ribs.

In addition to one or more of the features described herein, or as an alternative, further embodiments of the rotor may include that a size of the gap is based at least in part on a flux leakage.

In addition to one or more of the features described herein, or as an alternative, further embodiments of the rotor may include that the plurality of rotor ribs are formed from a soft magnetic composite material.

In addition to one or more of the features described herein, or as an alternative, further embodiments of the rotor may include that the plurality of rotor ribs are formed from lamination stacks.

In addition to one or more of the features described herein, or as an alternative, further embodiments of the rotor may include that the lamination stacks are formed from a grain-oriented lamination steel.

In addition to one or more of the features described herein, or as an alternative, further embodiments of the rotor may include that the grain-oriented lamination steel is oriented between the outer circumference and the inner circumference.

In addition to one or more of the features described herein, or as an alternative, further embodiments of the rotor may include that the rotor is disposed in an electric motor of a vehicle.

In another exemplary embodiment an electric motor includes a stator and a first rotor. The first rotor includes a first rotor yoke having a first outer circumference and a first inner circumference. The first rotor further includes a first plurality of rotor ribs on a first surface the first rotor yoke and extending between the first outer circumference and the first inner circumference. The first rotor further includes a first plurality of magnets, each of the first plurality of magnets being disposed adjacent to and between two of the first plurality of rotor ribs.

In addition to one or more of the features described herein, or as an alternative, further embodiments of the electric motor may include a second rotor having: a second rotor yoke having a second outer circumference and a second inner circumference; a second plurality of rotor ribs on a second surface the second rotor yoke and extending between the second outer circumference and the second inner circumference; and a second plurality of magnets, each of the second plurality of magnets being disposed adjacent to and between two of the second plurality of rotor ribs.

In addition to one or more of the features described herein, or as an alternative, further embodiments of the electric motor may include that the stator is disposed between the first rotor and the second rotor.

In addition to one or more of the features described herein, or as an alternative, further embodiments of the electric motor may include that the first plurality of rotor ribs are spaced a first distance from the stator, and wherein the first plurality of magnets are spaced a second distance from the stator.

In addition to one or more of the features described herein, or as an alternative, further embodiments of the electric motor may include that the first distance is less than the second distance.

In addition to one or more of the features described herein, or as an alternative, further embodiments of the electric motor may include that the first plurality of rotor ribs are formed from lamination stacks, wherein the lamination stacks are formed from a grain-oriented lamination steel, and wherein the grain-oriented lamination steel is grain-oriented between the first outer circumference and the first inner circumference.

In addition to one or more of the features described herein, or as an alternative, further embodiments of the electric motor may include that the electric motor is disposed in a vehicle.

In addition to one or more of the features described herein, or as an alternative, further embodiments of the electric motor may include that at least one of the first plurality of magnets is adjacent to but spaced apart from at least one of the first plurality of rotor ribs, defining a gap between the at least one of the first plurality of magnets and the at least one of the first plurality of rotor ribs.

In yet another exemplary embodiment a vehicle includes a rechargeable energy storage system having a battery. The vehicle further includes an electric motor to receive electric power from the rechargeable energy storage system. The electric motor includes a stator, a first rotor, and a second rotor. The first rotor includes a first rotor yoke having a first outer circumference and a first inner circumference, a first plurality of rotor ribs on a first surface the first rotor yoke and extending between the first outer circumference and the first inner circumference, and a first plurality of magnets, each of the first plurality of magnets being disposed adjacent to and between two of the first plurality of rotor ribs. The second rotor includes a second rotor yoke having a second outer circumference and a second inner circumference, a second plurality of rotor ribs on a second surface the second rotor yoke and extending between the second outer circumference and the second inner circumference, and a second plurality of magnets, each of the second plurality of magnets being disposed adjacent to and between two of the second plurality of rotor ribs.

In addition to one or more of the features described herein, or as an alternative, further embodiments of the vehicle may include that the stator is disposed between the first rotor and the second rotor.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

The following description is merely exemplary in nature and is not intended to limit the present disclosure, its application or uses. It should be understood that throughout the drawings, corresponding reference numerals indicate like or corresponding parts and features.

Figure 1:
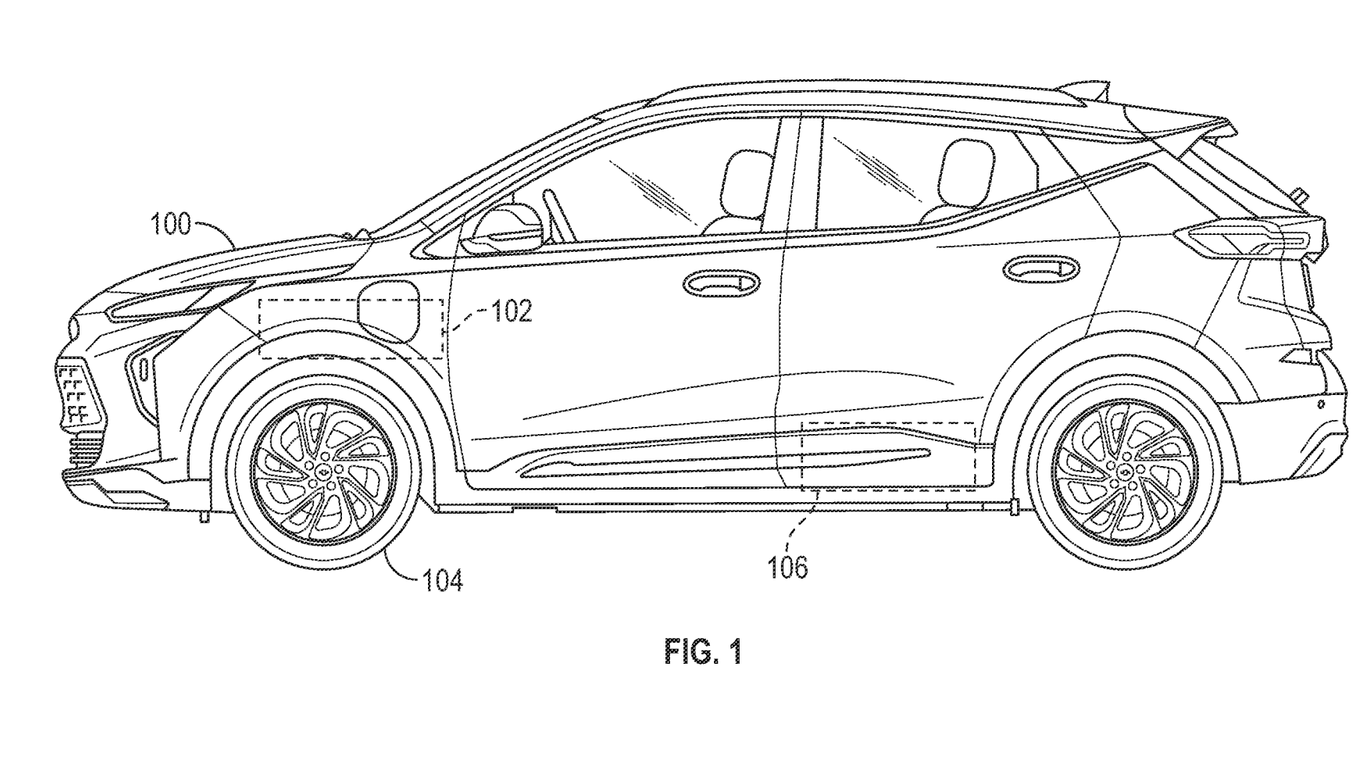
FIG. 1 shows a schematic illustration of a vehicle according to one or more embodiments described herein.

FIG. 1 shows a vehicle 100 according to one or more embodiments described herein. The vehicle 100 can be a car, a truck, a van, a bus, a motorcycle, a boat, or any other type of automobile. According to an embodiment, the vehicle 100 includes an internal combustion engine fueled by gasoline, diesel, or the like. According to another embodiment, the vehicle 100 is a hybrid electric vehicle partially or wholly powered by electrical power. According to another embodiment, the vehicle 100 is an electric vehicle powered by electrical power. In the example of FIG. 1, the vehicle 100 is an electric vehicle (or hybrid electric vehicle) and includes an electric motor 102. The electric motor 102 can be mechanically coupled to a wheel 104 of the vehicle 100 to apply rotational force to the wheel, creating a driveline. In some examples, a vehicle 100 can include multiple electric motors. The electric motor 102 receives electric power from a rechargeable energy storage system (RESS) 106, which can include one or more batteries for storing electric power. The batteries can be recharged, for example, using a charging station. The RESS 106 can also provide electric power to other systems of the vehicle (e.g., climate control systems, infotainment systems, etc.) (not shown).

According to an embodiment, the electric motor 102 can include a stator and a rotor that rotates relative to the stator. Together, the stator and rotor convert electrical power to mechanical power. According to one or more embodiments described herein, the electric motor 102 is an axial flux motor that uses surface mounted magnets to realize high torque density compared to conventional interior permanent magnet rotors. One or more embodiments described herein provides core material (referred to as "rotor ribs" or simply "ribs") between the magnet poles. Reluctance torque is generated to further increase torque density or reduce the usage of magnets for axial flux motor.

Figure 2A:
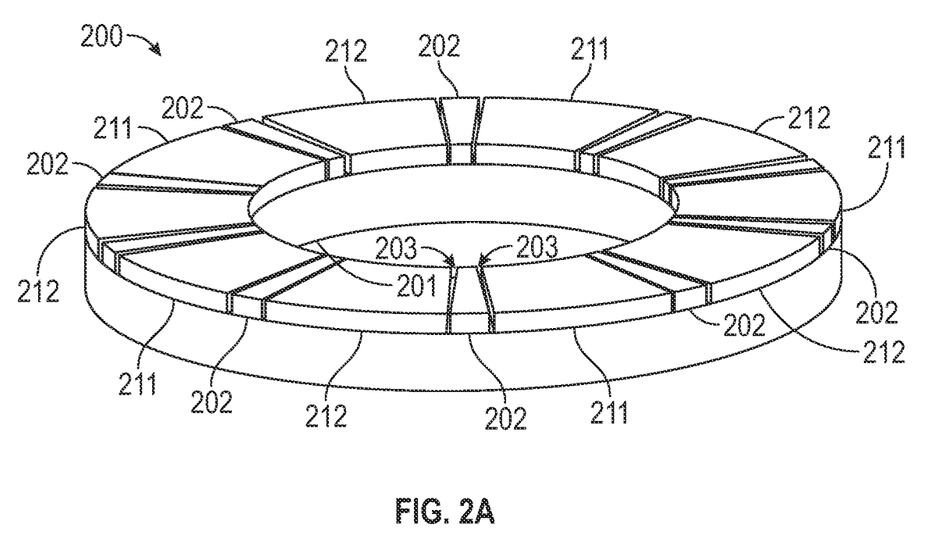
FIGS. 2A-2C show a rotor having a rotor yoke and rotor ribs according to one or more embodiments described herein.
Figure 2B:
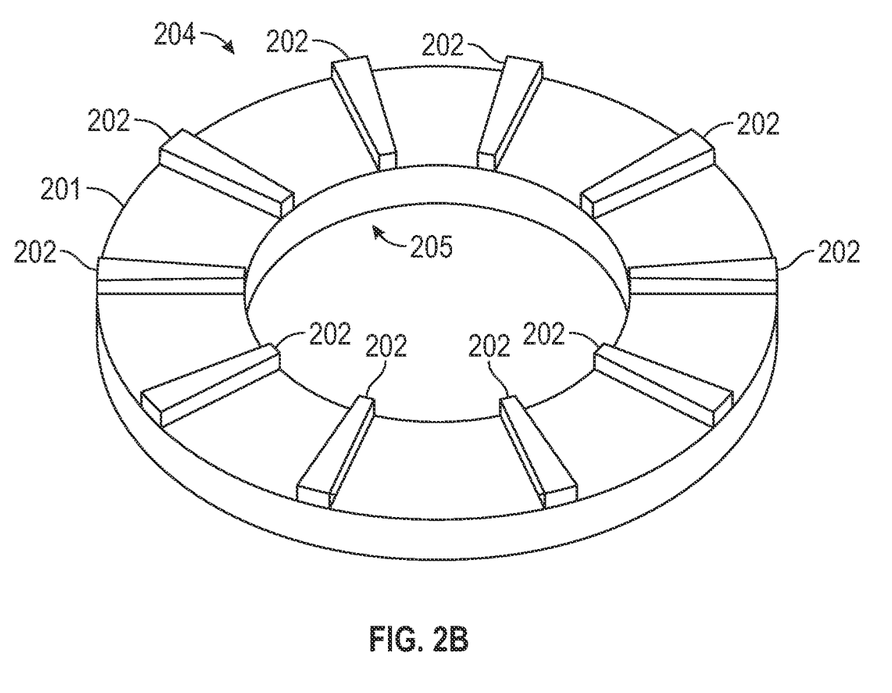
Figure 2C:
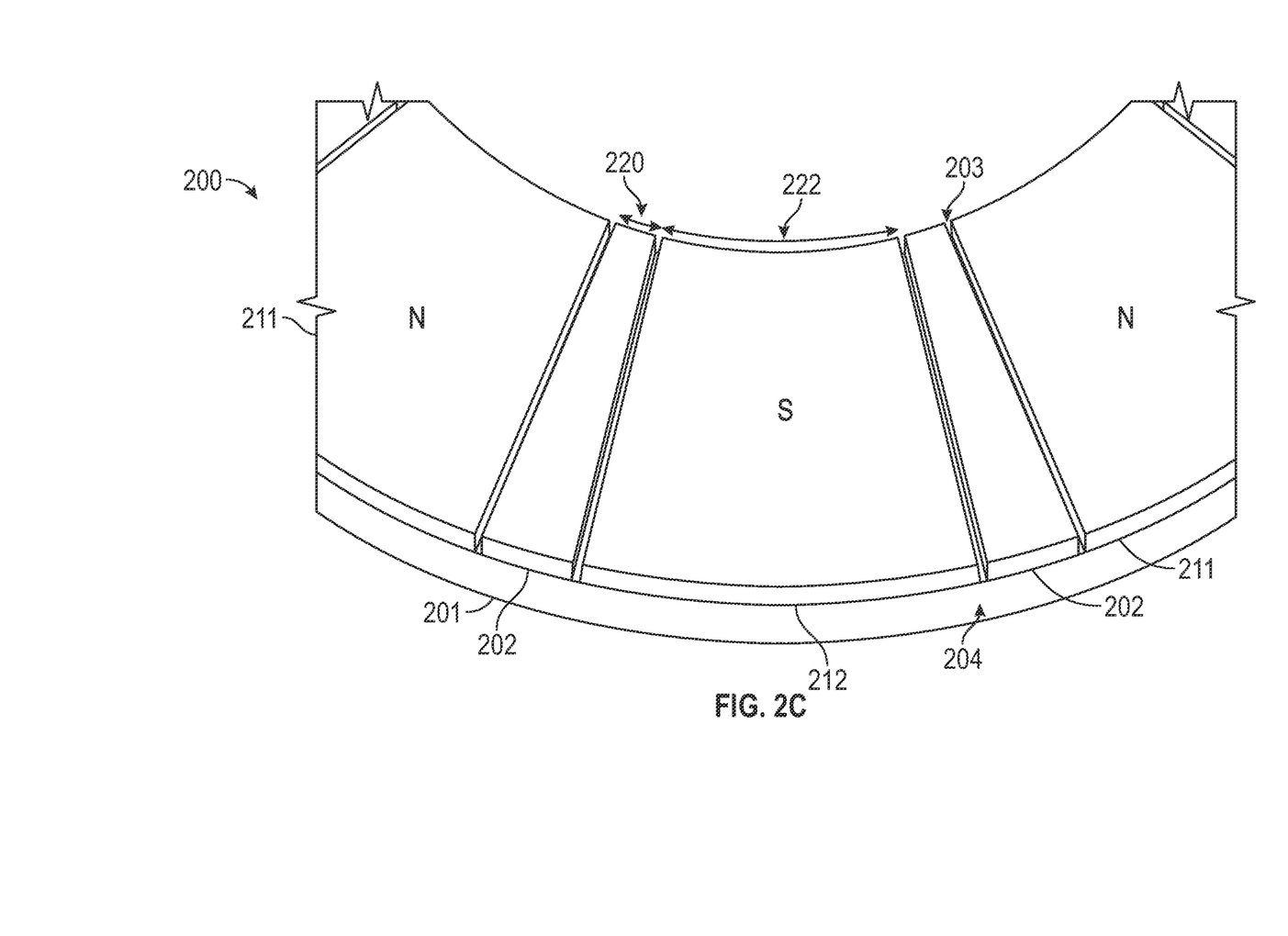

FIGS. 2A, 2B, and 2C are now described together. FIGS. 2A-2C show a rotor 200 having a rotor yoke 201 and rotor ribs 202 according to one or more embodiments described herein. The rotor 200 can include magnets 211, 212 (also referred to as "permanent magnets") as shown in FIGS. 2A and 2C. According to an embodiment, the magnets 211 and 212 have opposite polarities relative to one another. For example, the magnets 211 have a "north" polarity facing away from the rotor yoke 201 while the magnets 212 have a "south" polarity facing away from the rotor yoke 201.

The rotor ribs 202 are arranged between the magnets 211, 212 as shown. For example, each of the magnets 211, 212 is separated from other of the magnets 211, 212 by one of the rotor ribs 202. According to one or more embodiments described herein, the rotor ribs 202 are substantially trapezoidal in shape (e.g., a cross section of the rotor ribs 202 is substantially trapezoidal). According to one or more embodiments described herein, the rotor ribs 202 are substantially rectangular in shape (e.g., a cross section of the rotor ribs 202 is substantially rectangular). According to one or more embodiments described herein, the rotor ribs 202 are made from a soft magnetic composite material, such as an isotropic, high resistive soft magnetic composite (SMC) material for electromagnetic applications. According to one or more embodiments described herein, the rotor ribs 202 are integrally formed with the rotor yoke 201 to create a monolithic rotor. According to one or more embodiments described herein, the rotor ribs 202 are formed separately from the rotor yoke 201 and are affixed to the rotor yoke 201, such as by using an adhesive. According to one or more embodiments described herein, the rotor ribs 202 extend between an outer circumference 204 of the rotor yoke 201 and an inner circumference 205 of the rotor yoke 201.

According to an embodiment, as shown in FIGS. 2A and 2C, the magnets 211, 212 can be spaced apart from the rotor ribs 202 such that a gap 203 exists between an edge of each of the magnets 211, 212 and a respective one of the rotor ribs 202. A distance between edges of adjacent rotor ribs 202 and magnets 211, 212—that is, a distance of the gap 203—can be determined based on flux leakage. For example, the gap 203 can be determined to reduce flux leakage. According to one or more embodiments described herein, the gap 203 can be filled with nonmagnetic material (e.g., epoxy) to provide mechanical integrity.

Each of the rotor ribs 202 is defined by a rib span 220, as shown in FIG. 2C. Similarly, each of the magnets 211, 212 is defined by a magnet span 222. The distance of the rib span 220 can vary in different embodiments. For example, the distance of the rib span 220 can be optimized according to torque performance of the electric motor in which the rotor 200 operates. Similarly, the distance of the magnet span 222 can vary in different embodiments.

Figure 3A:
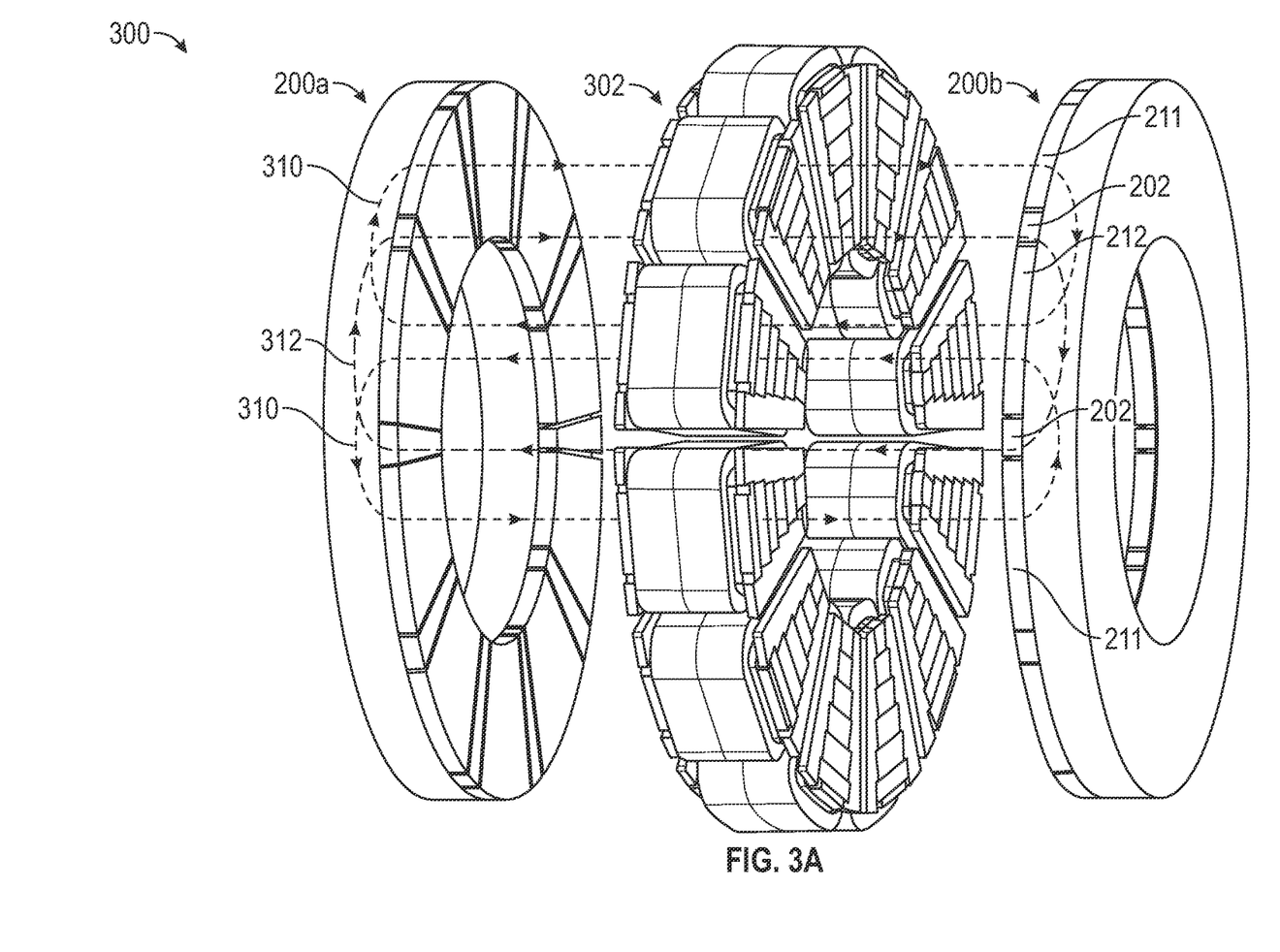
FIG. 3A shows a schematic illustration of a rotor-stator-rotor assembly for an electric motor according to one or more embodiments described herein.

FIG. 3A shows a schematic illustration of a rotor-stator-rotor assembly 300 for an electric motor (e.g., the electric motor 102) according to one or more embodiments described herein. In this example, the assembly 300 includes a stator 302 disposed between a first rotor 200a and a second rotor 200b configured and arranged as shown. As can be seen, two different fluxes are generated by the assembly 300 as a result of the arrangement of the first and second rotors 200a, 200b and the stator 302. The two different fluxes include a D-axis flux 310 and a Q-axis flux 312. The D-axis flux 310 passes through the magnets 211, 212. The Q-axis flux 312 passes through the rotor ribs 202 and is substantially 90° to the D-axis flux 310.

Figure 3B:
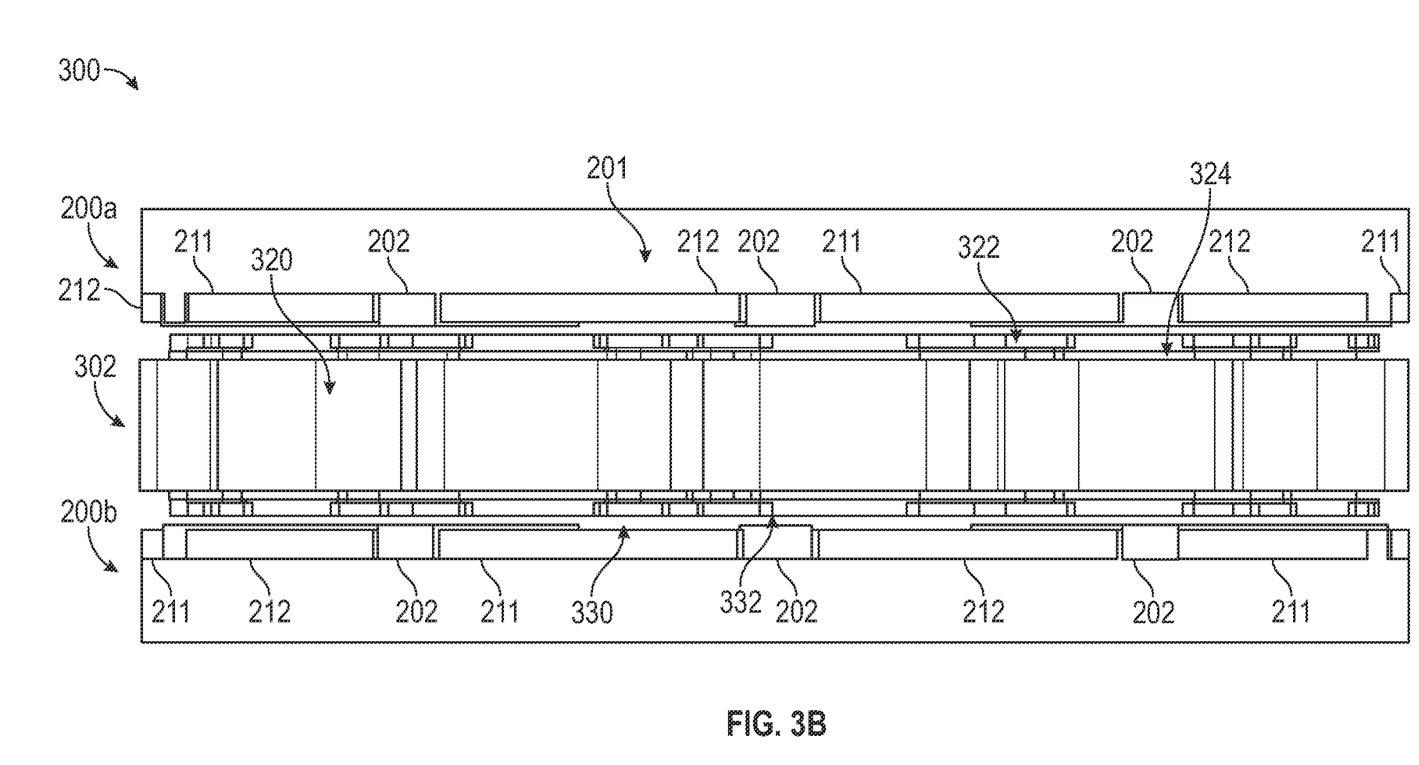
FIG. 3B shows a cross-sectional view of the assembly according to one or more embodiments described herein.

FIG. 3B shows a cross-sectional view of the assembly 300 according to one or more embodiments described herein. As in FIG. 3A, the assembly 300 in FIG. 3B includes the stator 302 disposed between the first rotor 200a and the second rotor 200b. The stator 302 includes coils 320 and stator cores 322. The first rotor 200a is spaced apart from the stator 302; similarly, the second rotor 200b is spaced apart from the stator 302. A distance between each of the first and second rotors 200a can vary depending on the configuration of the magnets 211, 212 and the rotor ribs 202. For example, a first gap 330 is a gap between stator cores 322 and the magnets 211, 212. Similarly, a second gap 332 is a gap between the stator cores 322 and the rotor ribs 202. According to embodiments, the relative distance represent by the first gap 330 and the second gap 332 can be different, as shown in FIG. 3B, or can be substantially the same. The first and second gaps 330, 332 can be optimized. For example, the first gap 330 can be relatively larger than the second gap 332. The relatively larger first gap 330 reduces potential flux leakage between the magnets 211, 212, and the relatively smaller second gap 332 increases the Q-axis flux 312.

Figure 4A:
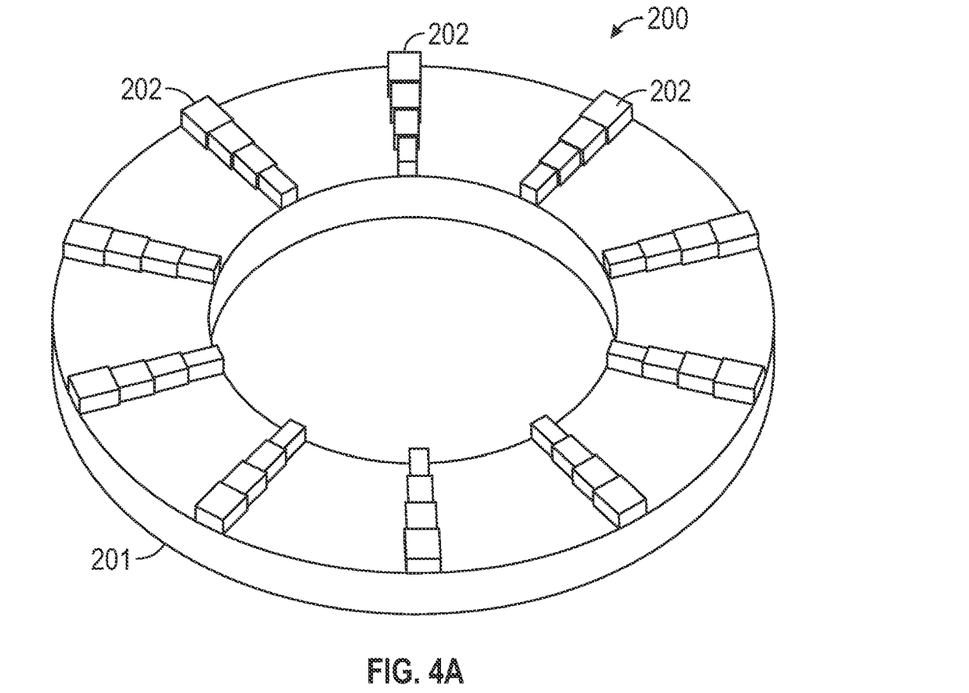
FIGS. 4A and 4B show an example of the rotor with rotor ribs formed from lamination stacks according to one or more embodiments described herein.
Figure 4B:
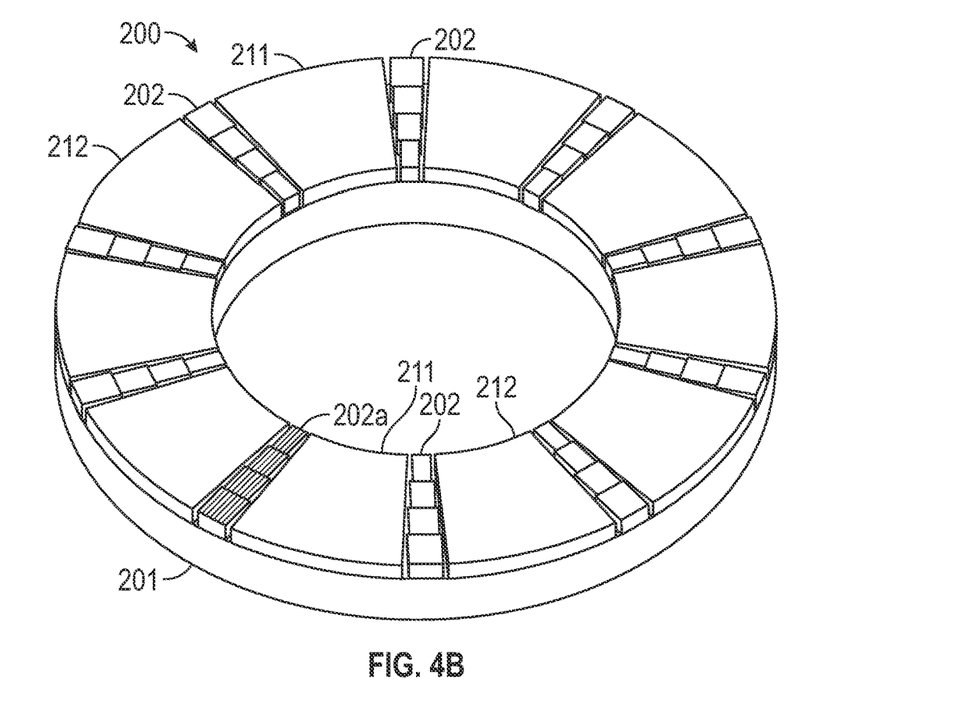

The rotor ribs 202 can be formed in different ways. For example, as described herein, the rotor ribs 202 can be integrally formed with the rotor yoke 201. As another example, the rotor ribs 202 can be formed separately and affixed to the rotor yoke 201. For example, the rotor ribs 202 can be formed by laminating stacks of material together and affixing the resulting rotor ribs 202 to the rotor yoke 201. FIGS. 4A and 4B show an example of the rotor 200 with rotor ribs 202 formed from lamination stacks according to one or more embodiments described herein. The lamination stacks reduce eddy currents within the electric motor. As can be seen in the example of FIGS. 4A and 4B, the rotor ribs 202 are lamination stacks. According to an embodiment, as shown in FIG. 4B, the rotor ribs 202 (e.g., the rotor rib 202a) are grain-oriented between the outer and inner circumferences (see, e.g., FIG. 2B) to reduce flux leakage. As shown in FIG. 4B, a grain-oriented lamination steel can be used to improve motor performance. According to one or more embodiments described herein, if the individual laminations (thin layers shown in the rotor rib 202a of FIG. 4B) in each of the four blocks (seen stacked from inner to outer circumference (see, e.g., FIG. 2B)) have a stacking direction like the rotor rib 202a, flux leakage is reduced. For the example rotor rib 202a, the individual laminations are stacked in the circumferential direction (e.g., around the rotor 200), while the stacked blocks are positioned from inner to outer circumferences like shown.

The terms "a" and "an" do not denote a limitation of quantity, but rather denote the presence of at least one of the referenced item. The term "or" means "and/or" unless clearly indicated otherwise by context. Reference throughout the specification to "an aspect", means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

When an element such as a layer, film, region, or substrate is referred to as being "on" another element, it can be directly on the other element or intervening elements may also be present. In contrast, when an element is referred to as being "directly on" another element, there are no intervening elements present.

Unless specified to the contrary herein, all test standards are the most recent standard in effect as of the filing date of this application, or, if priority is claimed, the filing date of the earliest priority application in which the test standard appears.

Unless defined otherwise, technical and scientific terms used herein have the same meaning as is commonly understood by one of skill in the art to which this disclosure belongs.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A rotor comprising:
   a rotor yoke having an outer circumference and an inner circumference;
   a plurality of rotor ribs on a surface of the rotor yoke and extending between the outer circumference and the inner circumference; and
   a plurality of magnets, each of the plurality of magnets being disposed adjacent to and between two of the plurality of rotor ribs,
   wherein at least one of the plurality of magnets is adjacent to but spaced apart from at least one of the plurality of rotor ribs, defining a gap between the at least one of the plurality of magnets and the at least one of the plurality of rotor ribs.

2. The rotor of claim 1, wherein the plurality of rotor ribs have a substantially rectangular cross section.

3. The rotor of claim 1, wherein the plurality of rotor ribs have a substantially trapezoidal cross section.

4. The rotor of claim 1, wherein a size of the gap is based at least in part on a flux leakage.

5. The rotor of claim 1, wherein the plurality of rotor ribs are formed from a soft magnetic composite material.

6. The rotor of claim 1, wherein the plurality of rotor ribs are formed from lamination stacks.

7. The rotor of claim 6, wherein the lamination stacks are formed from a grain-oriented lamination steel.

8. The rotor of claim 7, wherein the grain-oriented lamination steel is oriented between the outer circumference and the inner circumference.

9. The rotor of claim 1, wherein the rotor is disposed in an electric motor of a vehicle.

10. An electric motor comprising:
a stator; and
a first rotor comprising:
   a first rotor yoke having a first outer circumference and a first inner circumference;
   a first plurality of rotor ribs on a first surface of the first rotor yoke and extending between the first outer circumference and the first inner circumference; and
   a first plurality of magnets, each of the first plurality of magnets being disposed adjacent to and between two of the first plurality of rotor ribs,
   wherein at least one of the first plurality of magnets is adjacent to but spaced apart from at least one of the first plurality of rotor ribs, defining a gap between the at least one of the first plurality of magnets and the at least one of the first plurality of rotor ribs.

11. The electric motor of claim 10, further comprising a second rotor comprising:
a second rotor yoke having a second outer circumference and a second inner circumference;
a second plurality of rotor ribs on a second surface of the second rotor yoke and extending between the second outer circumference and the second inner circumference; and
a second plurality of magnets, each of the second plurality of magnets being disposed adjacent to and between two of the second plurality of rotor ribs.

12. The electric motor of claim 11, wherein the stator is disposed between the first rotor and the second rotor.

13. The electric motor of claim 10, wherein the first plurality of rotor ribs are spaced a first distance from the stator, and wherein the first plurality of magnets are spaced a second distance from the stator.

14. The electric motor of claim 13, wherein the first distance is less than the second distance.

15. The electric motor of claim 10, wherein the first plurality of rotor ribs are formed from lamination stacks, wherein the lamination stacks are formed from a grain-oriented lamination steel, and wherein the grain-oriented lamination steel is oriented between the first outer circumference and the first inner circumference.

16. The electric motor of claim 10, wherein the electric motor is disposed in a vehicle.

17. A vehicle comprising:
a rechargeable energy storage system comprising a battery; and
an electric motor to receive electric power from the rechargeable energy storage system, the electric motor comprising:
a stator; and
a first rotor comprising:
   a first rotor yoke having a first outer circumference and a first inner circumference;
   a first plurality of rotor ribs on a first surface of the first rotor yoke and extending between the first outer circumference and the first inner circumference;
   a first plurality of magnets, each of the first plurality of magnets being disposed adjacent to and between two of the first plurality of rotor ribs,
   wherein the first plurality of rotor ribs are formed from lamination stacks that are formed from a grain-oriented lamination steel, and wherein the grain-oriented lamination steel is oriented between the first outer circumference and the first inner circumference; and
second rotor comprising:
   a second rotor yoke having a second outer circumference and a second inner circumference;
   a second plurality of rotor ribs on a second surface of the second rotor yoke and extending between the second outer circumference and the second inner circumference; and
   a second plurality of magnets, each of the second plurality of magnets being disposed adjacent to and between two of the second plurality of rotor ribs.

18. The vehicle of claim 17, wherein the stator is disposed between the first rotor and the second rotor.

19. The vehicle of claim 17, wherein at least one of the first plurality of magnets is adjacent to but spaced apart from at least one of the first plurality of rotor ribs, defining a gap between the at least one of the first plurality of magnets and the at least one of the first plurality of rotor ribs.

20. The vehicle of claim 17, wherein at least one of the second plurality of magnets is adjacent to but spaced apart from at least one of the second plurality of rotor ribs, defining a gap between the at least one of the second plurality of magnets and the at least one of the second plurality of rotor ribs.

* * * * *